July 3, 1945.　　　A. L. FOSTER　　　2,379,481
SYSTEM OF HEAT EXCHANGE AND TEMPERATURE CONTROL
Filed March 23, 1943
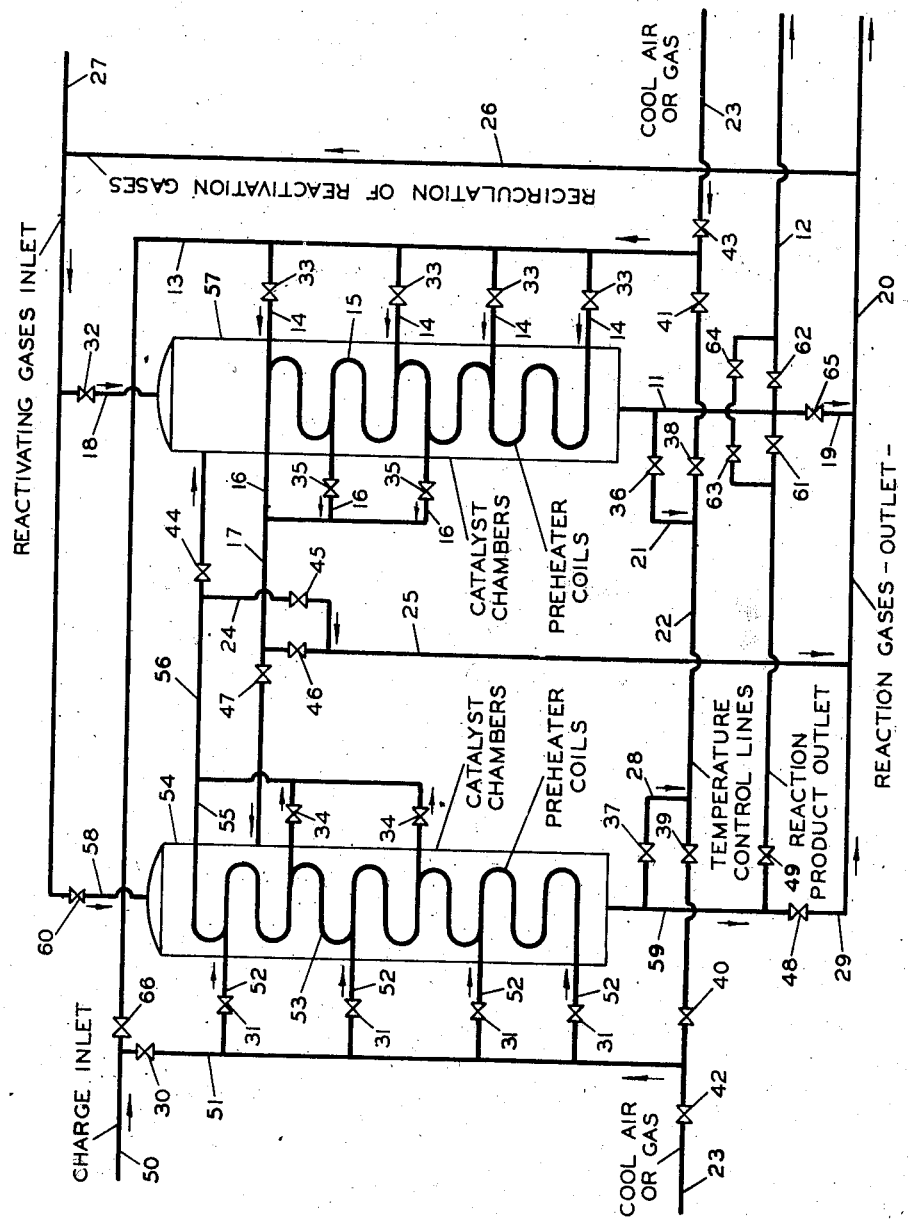
INVENTOR.
ARCH L. FOSTER
BY Hudson, Young & Yuiger
ATTORNEYS Patented July 3, 1945

2,379,481

UNITED STATES PATENT OFFICE 2,379,481

SYSTEM OF HEAT EXCHANGE AND TEMPERATURE CONTROL

Arch L. Foster, Tulsa, Okla., assignor to Phillips Petroleum Company, a corporation of Delaware Application March 23, 1943, Serial No. 480,210

2 Claims. (Cl. 196—52)

This invention relates to heat conservation and control in processes involving chemical or catalytic reactions, and more specifically it relates to exchange of heat between operating and/or reacting fluids in processes such as catalytic cracking and other catalytic reactions and to control of temperature of reactants, catalysts or fluids in such processes.

In catalytic reactions and in reactivation of catalysts, temperature is an important variable and the proper control of temperature is fundamental for the production of maximum yields of desired products and for the promotion of the efficiency of the process. At the same time conservation of available heat is of paramount economic importance.

One object of this invention is to provide apparatus and an improved method for controlling catalyst temperatures.

Another object of this invention is to provide a process and apparatus for the efficient utilization of heat of catalytic reaction and/or catalyst reactivation.

Still another object of this invention is to provide a process and apparatus for the efficient utilization of heat of catalytic reaction and/or catalyst reactivation, especially involving catalysts in place, for heating reactant materials to reaction temperatures.

Still other objects and advantages will be realized by those skilled in the art from a careful study of the following detailed disclosure.

A principle of temperature control according to my invention is to permit the said control to be carried out selectively, that is, to operate the controlling means so that the greatest effect is obtained at that point in the catalyst bed, or in that stage of the reaction where the greatest tendency exists to vary the temperature farthest from that desired or found to be the optimum temperature. For example, in the reactivation of a catalyst in situ by burning away carbon and other undesirable materials therefrom a "flame front" exists and progresses through the catalyst bed, normally from the point of inlet of the reactivating gases toward and finally reaching the point of outlet of the combustion products. It is at this flame front that the tendency of the temperature to become excessive is greatest. My invention is intended to provide specific, exact and controllable means whereby introduction of a controlling medium at this progressive flame front is greatest in volume and effect, and thus most effectually controls the temperature at that gradually moving region of high temperature.

An advantage of my invention over the art is the conservation of equipment and space required to carry out my invention commercially. The provision of means whereby the two main purposes of my invention are best served and in a novel manner, namely, the conservation of heat in preheating reactants to reaction temperature and the control of reaction and reactivation temperatures within optimum limits, also reduces the amount of equipment required, the space required for a unit employing the process and the complexity of the unit itself.

The details of my invention are presented fully in the following description and in the drawing which is a diagrammatic elevational view of one embodiment of my invention.

Referring now to the figure, which, for example, may represent a catalytic cracking apparatus, numerals 54 and 57 represent catalyst chambers of conventional design. The application of the principles as herein disclosed is not intended to be limited to the use of two catalyst chambers, since more than two may be used, depending upon the process, length of periods of onstream and off stream, and other conditions; the operation of two catalyst towers or chambers are described herein merely for simplicity of illustration. Cracking charge stock consisting of hydrocarbon materials such as gas oil, reduced crude, low grade naphtha, or other type of charge stock is admitted to the system through charge line 50 and branch lines 51 or 13, and a multiplicity of individual inlet lines 52 and 14, inlet lines 52 serve chamber 54 while inlet lines 14 conduct charge stock to chamber 57. The said individual inlet lines 52 connect header line 51 with various segments of heat exchanger 53 in catalyst vessel 54. This heat exchanger 53 is placed within the reaction chamber 54 and may be a pipe coil, parallel tubes set in a bank of header lines or other practical mechanical arrangement suited for the purpose, and which is provided with individual means for admission of fluids in varying amounts and at several levels in said heat exchange unit. Outlet lines 55 from this heat exchange unit 53 are provided so that portions of the preheated charge stock may be withdrawn at a multiplicity of points to control the degree of preheat of the mass of the charge stock as well as the temperature of the catalyst during the exothermic reactivation portion of a cycle. These said outlet lines 55 manifold into an outlet header 56 which is connected directly to the catalyst chamber 57 in which the catalytic step is being carried out. Gases may be admitted to chamber 54 through line 58 for regeneration purposes, the effluent gases from the regeneration being carried by lines 59 and 20.

The reaction chamber 57 is for the most part a duplicate of reaction chamber 54 since both serve the same functions. Thus, the chamber 57 is equipped with reactant inlet line 56, reaction product outlet line 11, preheating or exchanger coil 15 with inlet lines 14 and outlet lines 16, these latter being manifolded to one header line 17 for conducting the preheated reactants to reaction chamber 54. Reactivating gases enter chamber 57 through line 18 and the products resulting from the reactivation step along with any unused reactivation gases exit through lines 11 and 20. By-pass line 21 connects lines 11 and 22 for by-passing a portion of the reactivation effluent gases into line 22 and thence into header line 51 and ultimately into exchanger coils 53 through branch lines 52. Similarly the regeneration gas outlet line 59 in the bottom of the reaction chamber 54 is equipped with a by-pass line 28 for conduction of a portion of the regeneration products into line 22 and thence through line 13, branch lines 14 and finally into various coils of the exchanger 15. Line 25 is provided as a by-pass line in case all or a portion of the effluent heating gases from exchanger 15 are not needed nor desired in the catalyst bed in chamber 54. Similarly lines 24 and 25 serve as the corresponding by-pass connecting lines 56 and 17, respectively to reaction gas outlet line 20 to by-pass all or a portion of the combustion effluents from exchangers 53 and 15 to outlet line 20. Numeral 12 refers to an outlet line which is intended to carry reaction product from the catalytic apparatus. Line 59 connects catalyst chamber 54 with this line 12 while line 11 connects chamber 57 with said line 12. Lines 19 and 29 connect with lines 11 and 59 to carry effluent reactivation gases from the chambers 57 and 54, respectively. Lines 23 connect with temperature control line 22. Line 26 connects the reactivation gas outlet line 20 with the reactivation gas inlet line 27 for recycling purposes. Numerals 30 to 49, inclusive, and 60 to 66, inclusive, represent valves which it is thought need not be individually enumerated.

In the operation according to my invention raw charge stock consisting of such hydrocarbon materials as gas oil, reduced crude oil, low grade reforming naphtha or other type of charge stock enters the system through line 50, as shown in the figure. From charge line 50 the stock passes through branch line 51 into a multiplicity of individual inlet lines 52 and then into the preheater or heat exchanger 53 disposed within reaction or catalyst chamber 54. This preheater or heat exchanger may be a pipe coil, parallel tubes set in bands of header lines at either end of the preheater unit, or any other suitable mechanical arrangement and which may be provided with individual means for admission of fluids in varying amounts at a plurality of levels in the heat exchanger unit. Assuming that the catalyst in chamber 54 is undergoing regeneration and is well heated, the said charge stock entering the exchanger 53 by way of the individual inlet lines 52 is heated to reaction temperature, and passes from the said heating unit through individual lines 55 into header line 56 and through this line into the previously heated reaction or catalyst chamber 57.

The exchanger 53 within said chamber 54 is provided with a plurality of outlet lines 55 so that the preheated charge may be withdrawn from as many points to control the degree of preheat of the charge stock and to control the temperature within the catalyst bed undergoing regeneration, which reaction is highly exothermic. The preheated charge stock is then passed through line 56 to the point of inlet into reaction chamber 57 in which the desired reaction is carried out, the said preheated charge stock entering at such a temperature as previously determined to be optimum for the desired reaction. During this portion of the cycle reactivation gases are admitted to chamber 54 through lines 27 and 58 to effect the reactivation of the catalyst, previously spent. This reactivation consists usually in the admission of a controlled amount of air for the combustion of the carbonaceous material retained by the catalyst during the previous reaction portion of the cycle, the products of this reactivation exit from the chamber 54 through outlet lines 59 and 20. Lines 58 and 59 may be the same lines as those employed for entrance of charge stock and exit of reaction products.

The thus preheated charge stock entering chamber 57 by way of line 56 passes downward through the catalyst bed and the reaction products exit therefrom through line 11 and from my apparatus through line 12. When the catalyst in the chamber 57 has lost its activity to a point beyond which it is uneconomical to operate, the reaction cycle is then terminated and regeneration begun. In a well balanced operation the catalyst in reactor 57 becomes spent at the same time that the catalyst in reactor 54 becomes fully regenerated. By closing valve 30 and opening valve 66 charge stock to be preheated is directed from the exchanger in reactor 54 to the exchanger in reactor 57, thus charge stock flows through lines 50, 13 and individual lines 14 into the exchanger 15 in said reactor. At the same time valve 44 is closed. Upon the switching of the charge stock as mentioned, valves 33 are opened to admit stock to said exchanger while valves 35 and 47 are opened to admit preheated charge stock through line 17 into the top of reactor 54. Reaction products leave this reactor by way of line 59, valves 49, 63, 64, and line 12. Reactivation gases are then directed to reactor 57 by closing valve 60 and opening valve 32. At the same time valve 48 in the reactivation gas outlet line is closed and the corresponding valve 65 in line 19 is opened thereby permitting reactivation gases to exit through lines 19 and 20. Valves 61 and 62 are closed and valves 63 and 64 are opened so as not to allow reaction products from reactor 54 to be contaminated with regeneration gases from chamber 57. During this portion of the cycle the endothermic conversion reaction is taking place in chamber 54 and the exothermic regeneration reaction in chamber 57. To prevent too rapid cooling of the catalyst during the conversion reaction, a portion of the hot regeneration combustion gases issuing from chamber 57 through line 11 is bled off from said line 11 through valve 36 and line 21 into line 22 from which this hot gas passes through valves 39 and 40 into branch line 51 and thence into the heat exchanger means 53 through the individual lines 52. Thus the desired temperature gradient within the catalyst bed during the cracking or other reaction may be maintained in addition to lengthening the cyclic life of the catalyst. Cooler air or other gas or vapor may be admitted through line 23 to line 22 for the double purpose of adding oxygen to the reactivation gases and to control the temperature of the gases entering the heating means 53 in reactor 54, thus lending aid in the control of the reaction temperature in this reactor. The gases so employed may exit from exchanger 53 through branch lines 55, header line 56, by-pass lines 24 and 25 into the reactivation gas outlet line 20. A portion of these gases from line 20 may be recycled to the incoming reactivation gases through lines 26 and 27 to control the reactivation temperature in reaction chamber 57 during that portion of the cycle.

During operations such as those just described the operation of the valve system is very important, as will be realized by those skilled in the art, and their operation may be manual, semi-automatic or fully automatic, as desired.

The operation just described wherein chamber 54 was "on stream" and chamber 57 "on regeneration" the valve settings are of course just the reverse as when chamber 57 is "on stream" and chamber 54 "on regeneration."

It is obvious that by the principles according to my herein disclosed invention the heat exchange and temperature control means in each chamber may be employed for two purposes, namely, the chambers and auxiliary equipment assemblies are more compact and less expensive, thus requiring less ground space, and conserving available heat in a much more efficient manner than is common practice in refineries and catalytic plants at the present time. Heat developed in the regeneration of the catalyst is used in a most efficient manner for preheating charge stock to reaction temperature and for controlling the temperature within the active catalyst for promotion of an endothermic conversion reaction. By this means the amount of preheating fuel may be materially reduced and at the same time reactions, yield and product quality are improved. The design of the heat exchange means employed in the catalyst chambers may be essentially of any type, and of any materials which are suited and available for the purpose at hand. The number of inlet pipes 52 and 14, outlet pipes 55 and 16 may be any number according to the size of the equipment, the reactivation and reaction temperatures employed, and other considerations well understood by those skilled in the art of the use of catalysts at high temperatures.

As mentioned above the design of the heat exchange means employed in the catalyst chambers may be of essentially any efficient type, one embodiment of which is illustrated in the drawing.

I claim:

1. A method of maintaining at a substantially constant desired temperature a conversion catalyst promoting an endothermic conversion reaction which comprises passing a hydrocarbon charge stock from a multiplicity of points in indirect heat exchange relation with a conversion catalyst undergoing exothermic regeneration in the first of a series of at least two catalyst zones, said exothermic regeneration resulting from passage of an oxygen containing gas through said conversion catalyst, passing the heated charge stock into direct contact with the conversion catalyst in the second of said catalyst zones wherein endothermic conversion occurs, passing hot regeneration effluent gases from said first catalyst zone from a multiplicity of points in indirect heat exchange relation with the hydrocarbon stock undergoing endothermic conversion in said second catalyst zone wherein heat is added to said endothermic conversion reaction, and removing the conversion product from the said second conversion zone.

2. The method as in claim 1 wherein the preheating of the hydrocarbon charge stock is controlled by control of the multipoint addition of the charge stock to the heat exchange step in said first catalyst zone, and wherein the endothermic heat of reaction is further controlled by control of the multipoint addition of the hot effluent regeneration gases to the heat exchange step in said second catalyst zone.

ARCH L. FOSTER.